V. A. HUFFMAN.
POWER TRANSMISSION AND STEERING MECHANISM FOR TRACTORS.
APPLICATION FILED JULY 30, 1917.
1,292,607.
Patented Jan. 28, 1919.
4 SHEETS—SHEET 1.
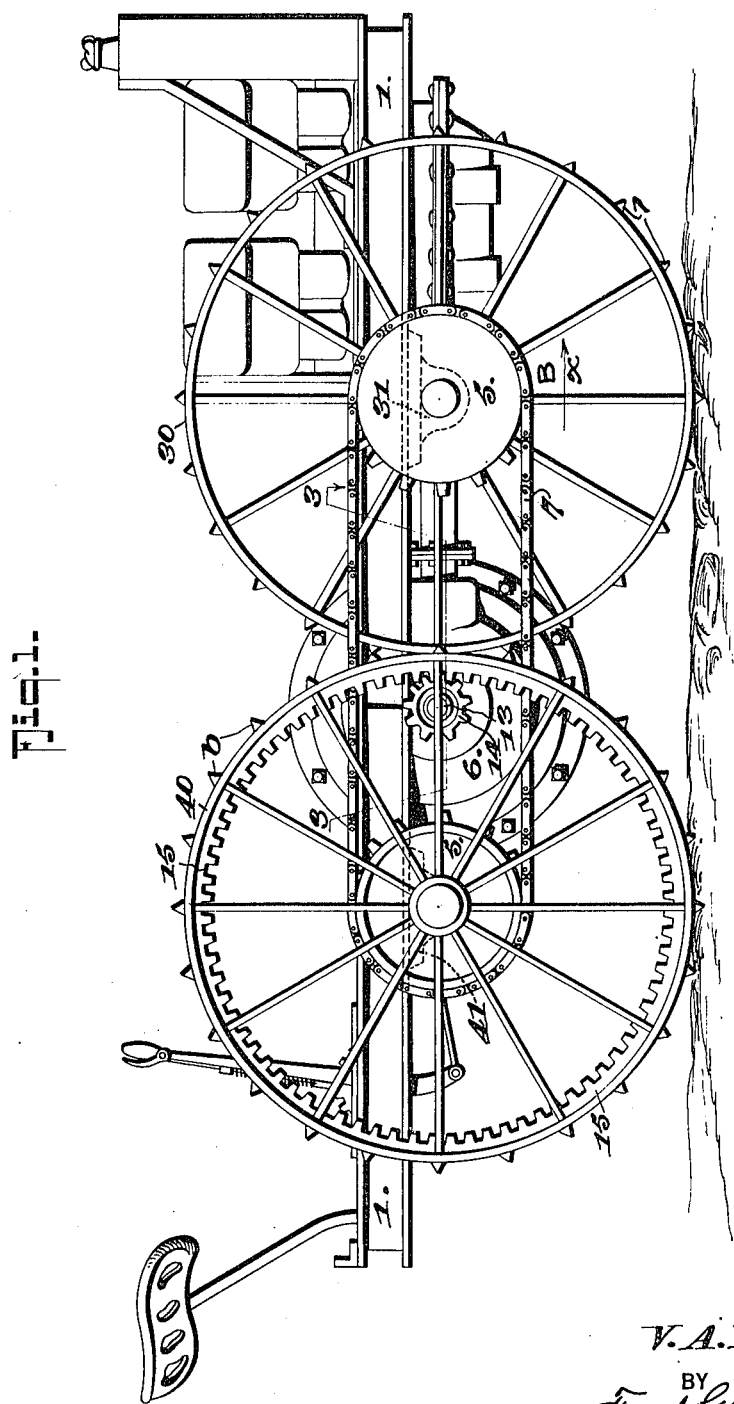
INVENTOR
V. A. Huffman.
BY
Fred G. Dieterich
ATTORNEYS

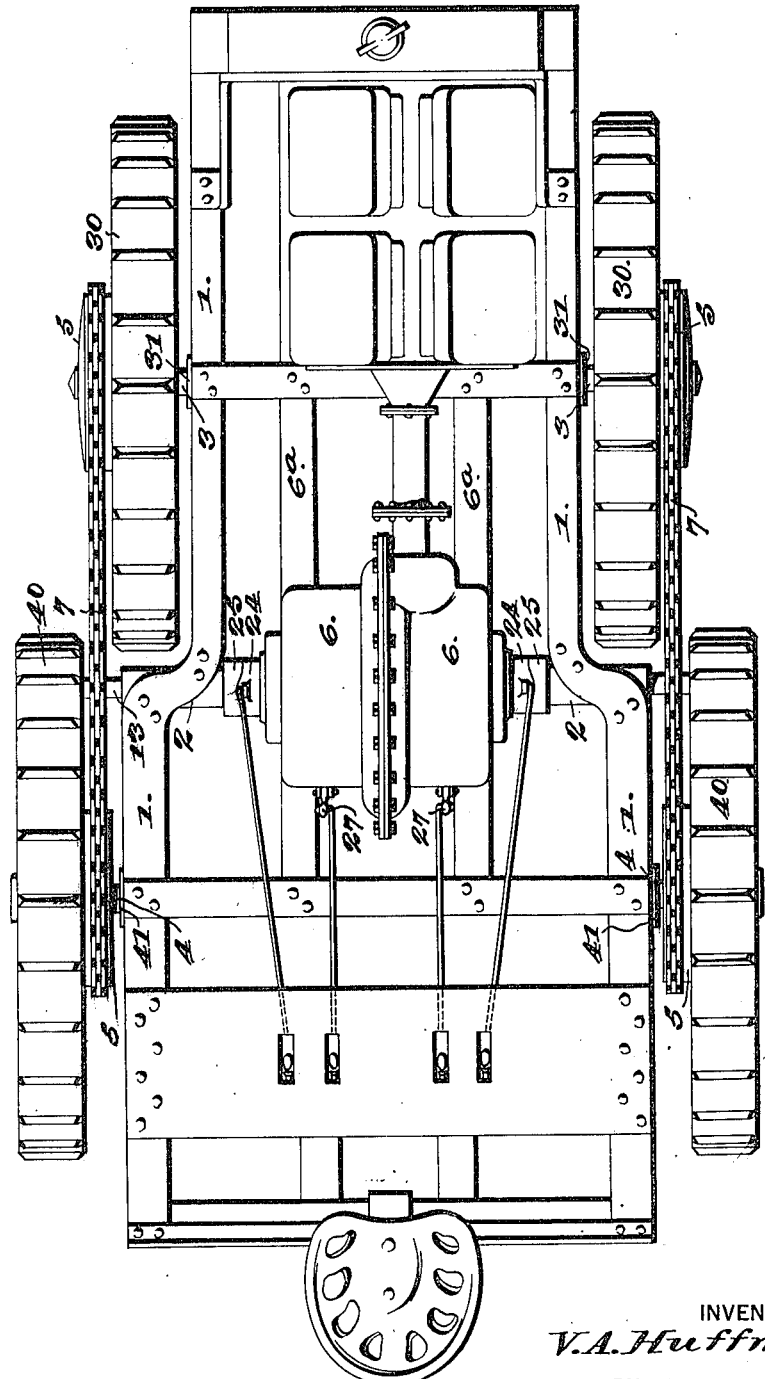

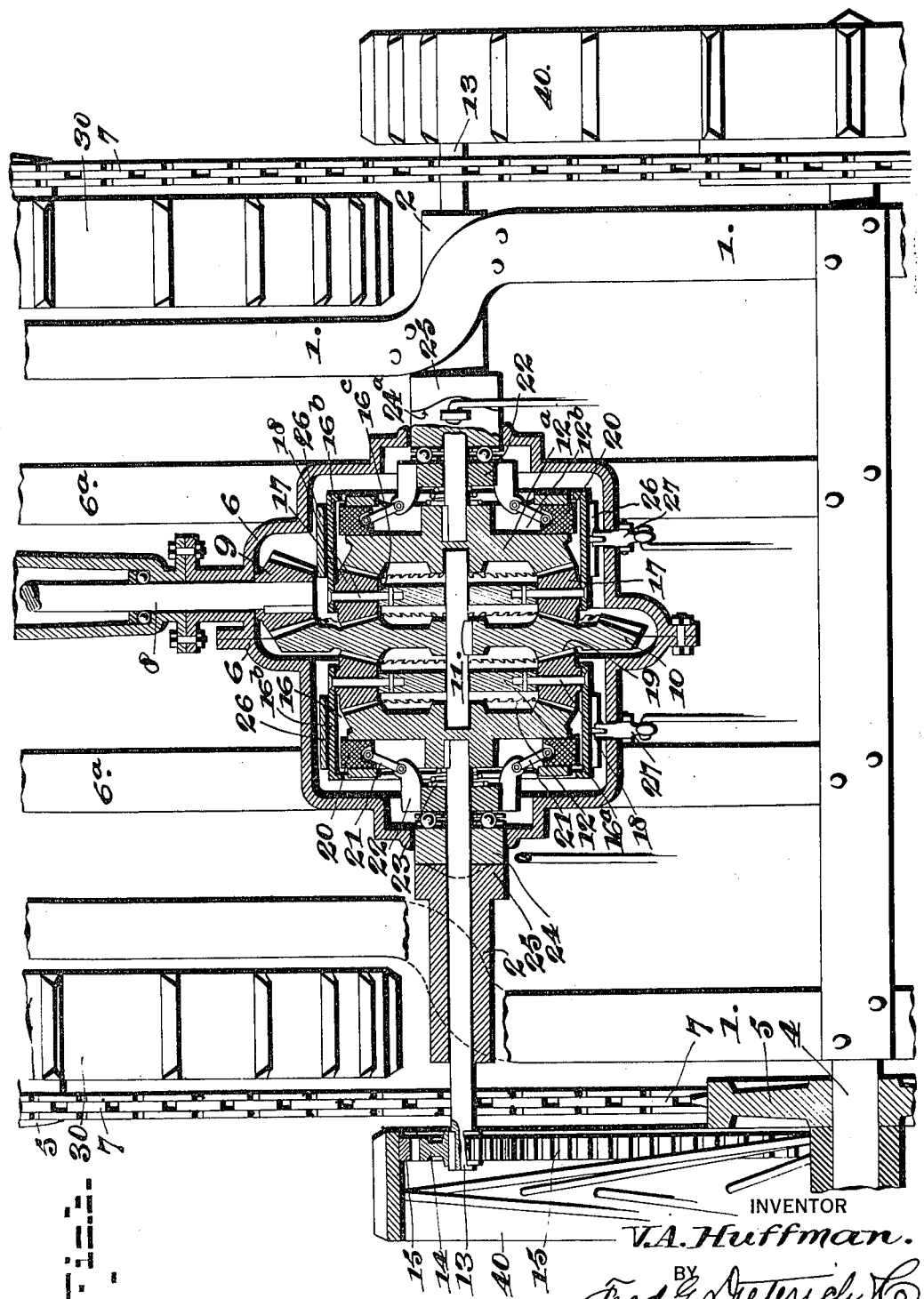

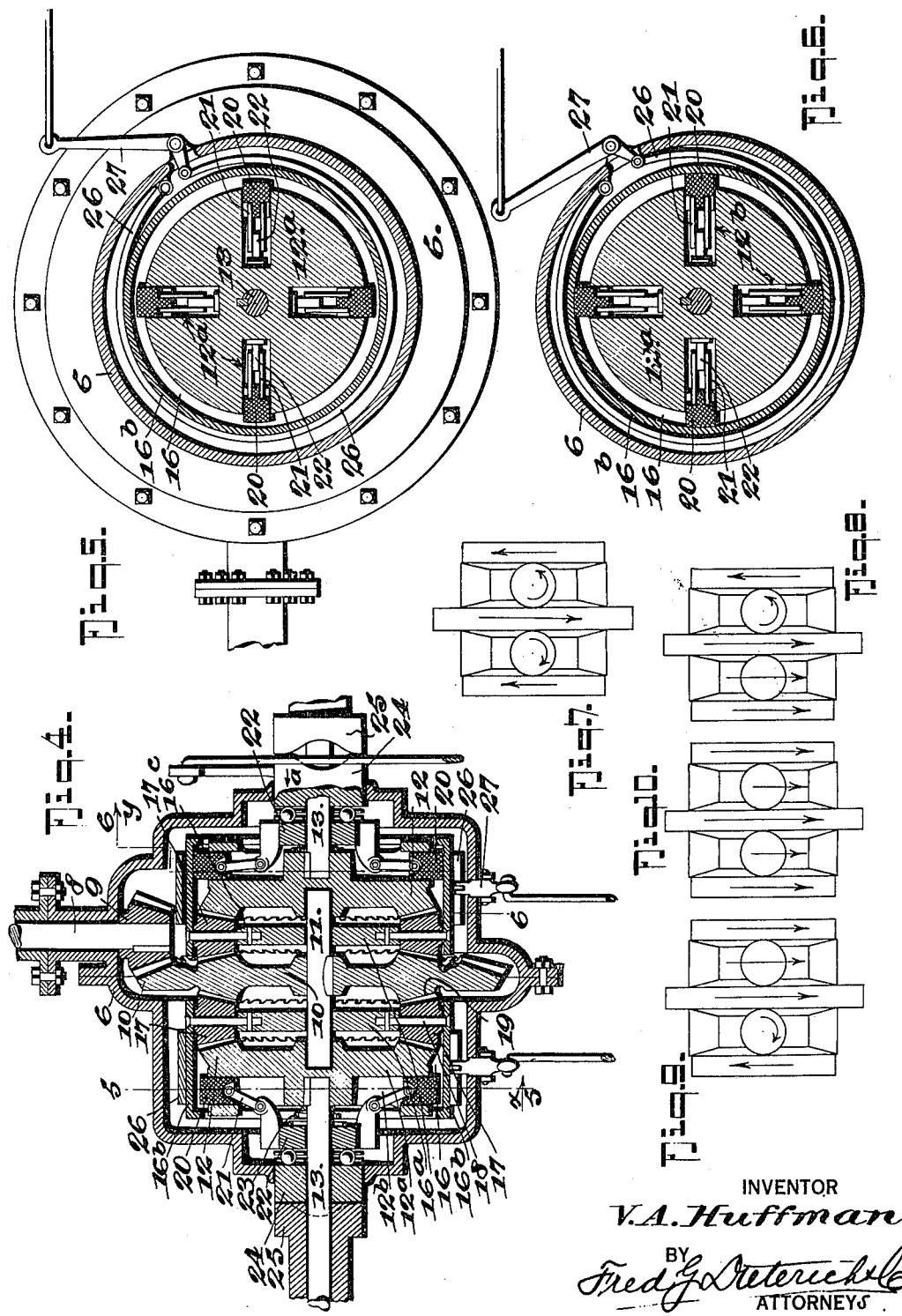

UNITED STATES PATENT OFFICE.

VERNE A. HUFFMAN, OF ROANOKE, INDIANA.

POWER-TRANSMISSION AND STEERING MECHANISM FOR TRACTORS.

1,292,607.  Specification of Letters Patent.  Patented Jan. 28, 1919.

Application filed July 30, 1917.  Serial No. 183,546.

*To all whom it may concern:*

Be it known that I, VERNE A. HUFFMAN, a citizen of the United States, residing at Roanoke, in the county of Huntington and State of Indiana, have invented certain new and useful Improvements in Power-Transmission and Steering Mechanism for Tractors, of which the following is a specification.

This invention which generally has reference to motor driven vehicles more particularly designed for use as farm tractors, primarily has for its purpose to provide an improved construction of farm tractor of a comparatively simple, and inexpensive character, easy of transportation, one in which the operative parts are strong, durable and easily controlled and having other features of convenience and adaptability that will be hereinafter more specifically stated.

My present invention in its more definite nature, has reference to an improved construction of farm tractor of the four wheel type and of the general arrangement that is fully described and illustrated in my co-pending application Serial No. 183,545 filed on even date with this application and in which is fully shown and described an improved construction of power transmission and steering mechanism that is more especially adapted for use with the particular construction of tractor embodied in the claims of the copending application and which forms the essential feature of my present application, since in this application no claims are made to the tractor body or frame *per se*, since such parts are the features that come within the scope of the claims in my said other pending application.

That the details of structure, the practical application of my power transmitting and steering mechanism may be fully understood and their different adjustment for directing the line of travel of the tractor clearly set forth, I have illustrated my improved farm tractor in its complete operative shape, it being understood, that as above noted, my present invention is confined to the power transmission and steering mechanism only.

In the accompanying drawings—

Figure 1 is a side elevation of my improved construction of farm tractor.

Fig. 2 is a top plan view thereof.

Fig. 3 is a horizontal section, partly plan view of the same, taken particularly on the line 3—3 of Fig. 1, and illustrating the differential or transmission gear mechanism, the operating parts thereof being shown as positioned for running loose.

Fig. 4 is a horizontal section of the transmission gear mechanism, the parts being adjusted for imparting a right turn to the tractor.

Fig. 5 is a cross section of the said transmission gear taken on the line 5—5 of Fig. 4, looking in the direction of the arrow $x$.

Fig. 6 is a similar view taken on the line 6—6 of Fig. 4, looking in the direction of the arrow $y$.

Figs. 7, 8, 9 and 10 are diagrammatic views hereinafter specifically referred to.

In carrying out my invention, the chassis or main frame is preferably shaped, in plan view, as indicated on Fig. 2, by reference to which, and to Fig. 3, it will be noticed long hub-like and oppositely disposed bearings 2—2 are secured upon the under side of the side beams 1—1 of the frame at a point about midway the front and rear ends thereof.

3 designates a front and 4 a rear axle and each of the said axles has tractor wheels 30—30 and 40—40 at the ends thereof that turn therewith, all of the wheels 30—40 being of the same diameter, and the axles mounted to turn loosely in their respective bearings 31—41; all of the wheels being, as it were, "alive" and each acting as a tractor.

The front wheels (and, at this point, it should be stated, the wheels 30—40 act as front wheels, according to the direction in which the tractor is traveling) hereinafter termed auxiliary forward drive wheels, in the arrangement shown, act as constantly moving anchors to the traction system, and the said auxiliary or front wheels also help to keep the tractor from digging itself into soft or plowed ground.

Each of the wheels 30—30 and 40—40 has a sprocket gear 5 which may be attached directly to the wheels or to the shaft when the wheel turns with the said shaft, and all of the said gears are of the same diameter to provide for turning all of the tractor wheels together.

Each pair of wheels at each side is coupled by an endless transmission chain 7 that takes around the coacting pairs of sprocket gears 5—5.

By reason of making all of the wheels of the tractor "alive" and joining each pair of wheels, as stated, a double traction contact is made with the ground and all the weight of the machine is thereby applied to traction, there being no dead weight, and furthermore, in the arrangement of the parts, as best shown in Fig. 1, and assuming the pull coming at B in the direction of the arrow $x$, that is, half way between the wheel hubs and the ground, the tractor wheel lugs $b$—$b$ have an increased holding capacity, the lugs on the said wheels operating, as it were, as anchors constantly moving in the manner that positively prevents slipping, it being understood that the same operation and results occur when the pull is opposite the direction indicated.

As heretofore stated, in my improved construction of four wheel tractors, with the pair of wheels at each side coupled to turn together in like direction, an independent operating control or steering mechanism is provided for each of said connected pairs of wheels and for such purpose, I employ the construction of the combined transmission and steering mechanism generally shown in Fig. 3 and illustrated in detail in Figs. 4 to 9 inclusive.

By now referring particularly to Fig. 3, it will be seen the said combined transmission and steering mechanism is mounted in a two part housing, the sections 6—6 of which are suitably supported upon and secured to a pair of longitudinal frame beams $6^a$—$6^a$, and the said sections, when joined together, as shown, provide a horizontal bearing for the inner end of the motor driven or power shaft 8 that projects into the said housing and carries a beveled gear 9.

10 designates, what I term, the master or driving gear and it is keyed to turn with a short shaft 11, the opposite ends of which have loose bearings in the oppositely disposed pair of planet gears 12—12.

Each planet gear 12 is keyed upon the inner end of a power transmission or driving shaft 13 and each of the said shafts carries a driving gear 14 that engages with and transmits the engine power to the main or master tractor wheels 40—40, the latter having annular internal racks 15—15 with which the gears 14 engage, as is clearly shown in Figs. 1 and 3.

A casing 16 surrounds each of the planet gears 12 and the said casing 16 each includes a disk-like end $16^a$ that turns loosely on the shaft 11 of the master gear 10, and a rim or hub $16^b$.

Each disk end $16^a$ has a plurality, preferably four, openings $16^c$ in each of which is mounted a beveled sun gear 17, as is best shown in Figs. 3 and 4, by reference to which it will be seen each of the gears 17 is loosely rotatable on a short shaft 18 that is fixedly mounted in the disk end $16^a$ and the hub $16^b$ and the two sets of sun gears, one at each side of the master gear, are at all times held in engagement with the opposite annular gear portions 19 on the said master gear.

Each planet gear 12 includes a head $12^a$ provided with a plurality, preferably four, radial grooves $12^b$ and in each groove $12^b$ is slidably mounted a clutch shoe 20 and the several shoes 20, at times, are forced radially outward and into frictional contact with the coincident hub $16^b$ of the casing 16 in which the wheel and clutch shoes are mounted.

Each set of clutch or brake shoes 20 is joined, through toggle link connections 21 with a hub 22, and the said hubs 22 slidably engage their respective driven shafts 13—13. The hubs 22 are normally moved along their respective shaft by cushion springs 23 to the position shown in Figs. 3 and 4 in which the said transmission and steering mechanism is adapted for running loose.

24—24 designate clutch sleeves rotatably mounted, one on each of the driven shafts 13—13 and each of the said clutch sleeves has a slip clutch face $24^a$—$24^a$ for coacting with like shape clutch members 25—25 that constitute the fixed part of the tubular bearings 2.

Under normal conditions, that is, when the transmission mechanism is arranged as in Fig. 3, the clutches $24^a$ of the members 24 engage the clutch ends 25 of the sleeves 2—2 but, when the said clutch members 24 are shifted to the position shown in Fig. 4 at right, the said clutch member is caused to slide on its shaft 13 in the direction indicated by the arrow $a$ on Fig. 4 and in consequence shift the hub 22 at that side along the shaft 13, and thereby, through the centrifugal expansion of the link devices 21 moves the shoes 20 into tight frictional engagement with the hub rim $16^b$ of the casing 16 in which the said shoes 20 operate, see Figs. 4 and 6.

26—26 designate clutch bands, one of such bands being provided for each casing hub or rim $16^a$. The construction of the said bands is clearly shown in Figs. 4, 5 and 6, from which it will be seen each of such bands is arranged for being operated by an ordinary bell crank lever control 27 actuated in any suitable way from the driver's seat.

From the foregoing description taken in connection with the drawings, the complete construction, the general operation of the parts that constitute my improved form of farm tractor and the advantages thereof will be readily apparent to those skilled in the art to which my invention relates.

While I have not shown or described a specific construction of lever connections for controlling the rotary clutch members on the shafts 13—13 and for actuating the clutch bands 26, in the practical application of my said invention the said controls, operable from the driver's seat, may be made for individually actuating the rotary clutch members or for simultaneously operating the clutch bands and the rotary clutch members in alternate pairs.

The different adjustments of the combined transmission and steering mechanism is best explained as follows:

*Drive forward.*—Both clutch bands 26 are applied to the hubs of the casing 16 and the clutch shoes are out of operative engagement with the casing hubs 16ᵇ—16ᵇ. When thus adjusted, the power from the engine shaft drives the master gear 10, the sun gears 17 and the planetary gears 12—12 in the direction indicated in the diagram, Fig. 7.

*Drive backward.*—The clutch shoes 20, at both sides, are forced out into locked engagement with the casing rims or hubs 16ᵇ to thereby hold the sun gears, the casings 16 and the master gear to turn as one in the direction indicated by the dotted arrows on Fig. 10.

*A right hand turn.*—The parts are in the position shown in Fig. 4, the clutch shoes 20 at the right hand side being locked with their coacting hubs 16ᵇ of the casing 16 at that side and the band clutch at the other side is in engagement with the casing rim or hub 16ᵇ at the other side, it being understood that by reversal of the said parts, a left hand turn is provided for.

When the engine is to run loose, both the clutch bands and the clutch shoes are out of operative engagement, see Fig. 3.

What I claim is:

1. In a tractor, the combination of a frame, a driving shaft, a pair of driven shafts in transverse alinement, gearing connecting each driven shaft with a tractor wheel, differential mechanism connecting the two driven shafts with the driving shaft, the said mechanism including lever controlled devices for adjusting the differential mechanism for imparting rotation to the pairs of driven shafts in like direction, in opposite direction, in alternate directions or for cutting out the said driven shafts from the driving shaft, the said differential mechanism including a master gear, sun and planet gear devices engaging with and on each side of the said master gear, each of the said sun and planet gear devices being mounted on their respective driven shafts, and lever control devices including clutch members for locking the driven shafts to their respective sun and planet gear devices, whereby to impart rotation to the driven shafts in one direction and other means for engaging the sun and planet gear devices and the master gear for imparting rotation to the driven shafts in the opposite direction.

2. In a tractor or the like, the combination of a frame, a motor mounted on the frame, a pair of driving shafts in transverse alinement, each having a direct gear connection with their respective side tractor wheels, a master driving gear, a motor driven shaft in mesh therewith, a sun and planet gear transmission at each side of and in mesh with the master gear, the said planet gear being fixedly mounted on their respective driving shafts, means for coupling either of the sun and planet gear mechanisms with the master gear to turn as a unit with the said master gear and other means for holding the said sun and planet gear mechanisms for being driven independent of the movement of the master gear, whereby as rotation to a wheel at one side is imparted in one direction, the wheel at the other side may run loose or in reverse direction.

3. In a motor vehicle having a frame; the combination with a driving shaft, a pair of driven shafts in transverse alinement, each of the driven shafts having a gear connection with a tractor wheel, coöperating transmission and differential mechanism, the said mechanism including a pair of oppositely disposed planet gears, each keyed to the driven shaft at their respective ends, a shaft journaled at its ends in the opposing planet gears, a master gear keyed on the said last mentioned shaft, a pair of casings loosely mounted on the last named shaft, said casings each including an annular rim, a series of sun gears carried on each casing that engage the planet gears at their respective sides, each planet gear including a hub-like body having a plurality of radial grooves, a clutch shoe slidably mounted in each of the said grooves, lever controlled means for shifting the said clutch shoes into a lock engagement with the annular rims of their adjacent casings, whereby to impart rotation to the driven shafts in one direction and other means for engaging the sun and planet gear devices and the master gear for imparting rotation to the driven shafts in the opposite direction.

4. In a tractor or the like having a frame and a motor thereon; the combination of a driving and a pair of transversely alined driven shafts, each of the said driven shafts having a gear connection with a tractor wheel at their respective sides of the frame, coöperative differential and transmission mechanism for each driven shaft, a master gear actuated from the drive shaft and common to both of the differential and transmission mechanisms, a separate lever control device coöperative with each transmission and differential mechanism and adapted to lock the transmission and differential mechanisms with the master wheel to rotate with the wheel and impart rotation to the driven shaft at one side in direction with that of the master gear and for holding the like mechanism at the other side to run free or for imparting motion to the driven shaft at that side in reverse direction.

VERNE A. HUFFMAN.